US011525988B2

(12) United States Patent
Wicker et al.

(10) Patent No.: US 11,525,988 B2
(45) Date of Patent: Dec. 13, 2022

(54) ASSEMBLY FOR INCREASING THE RESOLUTION OF A LASER SCANNING MICROSCOPE

(71) Applicant: Carl Zeiss Microscopy GmbH, Jena (DE)

(72) Inventors: Kai Wicker, Jena (DE); Ralf Netz, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 652 days.

(21) Appl. No.: 16/481,795

(22) PCT Filed: Jan. 25, 2018

(86) PCT No.: PCT/DE2018/100060
§ 371 (c)(1),
(2) Date: Jul. 29, 2019

(87) PCT Pub. No.: WO2018/141333
PCT Pub. Date: Aug. 9, 2018

(65) Prior Publication Data
US 2020/0026050 A1 Jan. 23, 2020

(30) Foreign Application Priority Data
Jan. 31, 2017 (DE) .................... 10 2017 101 829.8

(51) Int. Cl.
*G02B 21/00* (2006.01)
*G02B 27/10* (2006.01)
*G02B 27/12* (2006.01)

(52) U.S. Cl.
CPC ......... *G02B 21/00* (2013.01); *G02B 21/0056* (2013.01); *G02B 27/1066* (2013.01); *G02B 27/126* (2013.01); *G02B 21/0072* (2013.01)

(58) Field of Classification Search
CPC .......... G02T 15/00; G02B 27/22; G02B 3/14; G02B 21/0072; G02B 21/0056;
(Continued)

(56) References Cited

U.S. PATENT DOCUMENTS 4,061,425 A   12/1977  Wade
4,585,345 A   4/1986   Inoue
(Continued)

FOREIGN PATENT DOCUMENTS

CN  104034421 B   12/2015
WO  2008/052405 A1  5/2008
(Continued)

OTHER PUBLICATIONS

International Search Report from PCT/DE2018/100060, dated Jan. 25, 2018, dated Apr. 24, 2018.
Wicker et al., Interferometric resolution improvement for confocal microscopes, Optics Express, Sep. 17, 2007, pp. 12206-12216, vol. 15, No. 19.
(Continued)

*Primary Examiner* — William R Alexander
*Assistant Examiner* — Tamara Y. Washington
(74) *Attorney, Agent, or Firm* — Patentbar International PC

(57) ABSTRACT

An arrangement for increasing resolution of a laser scanning microscope has a simplified adjustment and lower susceptibility to errors. The pupil beam from the laser scanning microscope is coupled into a shortened common path interferometer, to make wavefronts of a pupil image mirrored at at least one axis and wavefronts of an unchanged pupil image interfere. The area of a pupil from the pupil beam is split into two complementary portions P and Q producing two partial beams separately supplied to at least one beam deflection means by total-internal reflection along the common path interferometer. The light of the interferometer branches from transmitted light of the one interferometer branch and reflected light of the other interferometer branch (Continued)

is made to interfere at a partly transmissive beam splitter layer to cause constructive interference C and destructive interference D of the wavefronts from the two different portions P and Q of the pupil.

18 Claims, 8 Drawing Sheets

(58) Field of Classification Search
CPC .............. G02B 27/1066; G02B 27/126; G02B 9/02042; G02B 21/0024; G02B 21/00; G02B 21/0032; G02B 21/02; G02B 21/06; G02B 21/18; A61B 3/1025; A61B 5/0068; A61B 1/00172; G06T 5/50; G01B 11/06; A61F 2/16; A61F 2240/008; G01N 2021/4126; G01N 21/41
See application file for complete search history.

(56) References Cited

U.S. PATENT DOCUMENTS

| | | |
|---|---|---|
| 8,405,059 B2 | 3/2013 | Heintzmann et al. |
| 2010/0059696 A1 | 3/2010 | Heintzmann et al. |

FOREIGN PATENT DOCUMENTS

| | | | | |
|---|---|---|---|---|
| WO | WO-2008052405 A1 * | 5/2008 | ........... | G03F 9/7049 |
| WO | 2008/093099 A2 | 8/2008 | | |

OTHER PUBLICATIONS

Currie et al., Four Stellar-Diameter Measurements by a New Technique: Amplitude Interferometry, The Astrophysical Journal, Jan. 1, 1974, pp. 131-134, vol. 187.

Saunders, J. B., Reflection, Transmission, and Phase Shift of Light at Imbedded Optical Films, Journal of the Optical Society of America, Jan. 1972, pp. 6-9, vol. 62, No. 1.

* cited by examiner

ASSEMBLY FOR INCREASING THE RESOLUTION OF A LASER SCANNING MICROSCOPE

RELATED APPLICATIONS

This Application is a U.S. National Stage Under 35 USC § 371 of International Application PCT/DE2018/100060, filed on Jan. 25, 2018, which in turn claims priority to German Patent Application DE 10 2017 101 829.8, filed Jan. 31, 2017, both of which are incorporated herein by reference in their entirety.

FIELD OF THE INVENTION

The invention relates to an arrangement for increasing the resolution of a laser scanning microscope (LSM), in particular for conventional and confocal laser scanning microscopes (CLSM).

Moreover, use in an LSM with a spatially resolving detector, preferably when processing microscopic images in conjunction with an airy scan system, is of particular interest.

BACKGROUND OF THE INVENTION

High-resolution laser scanning microscopes are increasingly important aids for diagnostics, laser surgery and research in medicine and biology as electron-microscopic and predominantly UV-radiation-based processing and examination methods are not suitable for living cells.

Image inversion interferometry (abbreviated III) is a known method for increasing the resolution and light efficiency in CLSM, as is described for fluorescence LSM, for example, in Optics Express volume 15, number 19 (2007), 12206 to 12216.

In order to obtain an increase in resolution at the LSM in this case, the descanned light in the detection path of an LSM is split at a beam splitter, the wavefront is laterally rotated with respect to one another in two separate interferometer branches before it is combined in interferometric fashion at a further beam splitter. The two interferometer outputs C (constructive) and D (destructive) are optionally imaged on pinholes and then recorded using integrating detectors.

If the emitting fluorophore lies on the image inversion axis, the two wavefronts rotated with respect to one another are identical to one another for reasons of symmetry and can perfectly interfere with one another; i.e., there is a full signal in C and a zero signal in D. By contrast, if the fluorophore lies at a great distance from the inversion axis, the mutually inverted wavefronts no longer overlap and therefore cannot interfere with one another either. A signal of 50% in each case arises in C and D.

An effective increase in the resolution arises as a result of this interferometric suppression of light not coming from the inversion axis (i.e., the current scan position). In an LSM, this effect can be combined with a punctiform illumination and a pinhole to obtain a further increase in resolution, a better depth resolution (improved sectioning) and a higher signal-to-noise (SNR) ratio.

Instead of a wavefront inversion, the wavefront also can be mirrored on a lateral axis. The resolution increase is then restricted to one direction (perpendicular to the mirror axis) as a result of this; however, the method can then also be used for line scan systems. A twofold application of the principle with mirroring about two mutually perpendicular axes once again brings about the point-symmetric increase in the resolution of the inversion. In this case, the optical transfer function (OTF) has a rectangular form and consequently transmits high spatial frequencies significantly better than the normally limiting wide-field transfer function, which has a virtually triangular form (see FIG. 2b in Optics Express 15, number 19 (2007), 12209).

WO 2008/093099 A2 describes a method and an arrangement for increasing the image resolution in the case of confocal laser scanning microscopes (CLSM), which still obtain significant improvements in the lateral resolution for pinhole apertures of approximately 1 airy unit. In this type of III, the image inversion is brought about by mirroring the entire image. In order to achieve the image inversion, the entire image must be divided and guided in two beam paths, with the inversion being implemented in one of the beam paths while the image remains unchanged in the other beam path. Subsequently, the beam paths are brought together again and the images are brought into interference.

All above-described III methods are very complicated above all in terms of adjustment and sensitive to interference effects, which make the use thereof in microscopes very difficult.

SUMMARY OF THE INVENTION

The invention is based on the object of finding a novel option for increasing the resolution in laser scanning microscopes (LSM) by way of image inversion interferometry (III), which allows a simplified adjustment and lower sensitivity to interference effects, and which causes lower production costs for an increase in resolution (of up to 40%) that is typical for III.

According to the invention, the object is achieved by a method for improving the resolution or the signal-to-noise ratio of a laser scanning microscope by means of image inversion interferometry, in which a pupil beam in an interferometer branch is mirrored at least once in order to make wavefronts of a pupil image mirrored at at least one axis and of an unmodified pupil image of another interferometer branch interfere, by way of the steps of:

coupling the pupil beam coming from the laser scanning microscope into a common path interferometer (2), splitting the area of a pupil (1) from the pupil beam along a defined axis (11) that is lateral to an optical axis (12) of the collimated beam into two complementary portions P and Q of the pupil (1) under the production of two partial beams that are guided in parallel along the common path interferometer (2) as two interferometer branches aligned lying opposite one another along the optical axis (12) and that are separately supplied to at least one beam deflection means by way of total-internal reflection, and making the light of the interferometer branches interfere at a partly transmissive beam splitter layer (34) after the at least one beam deflection, wherein light of the one interferometer branch, transmitted by means of the beam splitter layer (34), and reflected light of the other interferometer branch, and vice versa, form a combination of wavefronts of a first portion P with a second portion Q, complementary to the first portion P, of the pupil (1), and vice versa, such that constructive interference (C) and destructive interference (D) of the wavefronts are producible from the two different portions P and Q of the pupil (1).

Advantageously, splitting the pupil beam into complementary portions P and Q of the pupil in the common path interferometer is realized by means of a double wedge prism such that one of the two complementary portions P or Q is respectively guided in separate wedge prisms as interferometer branches with at least one internal reflection and the interference of the internally reflected light of the interferometer branches is brought about at a contact area, coated with the partly transmissive beam splitter layer, of the wedge prisms, wherein light of the one wedge prism, transmitted by the beam splitter layer, is superposed on reflected light of the other wedge prism and reflected light of the one wedge prism is superposed on transmitted light of the other wedge prism and wavefronts of the first portion P are made to interfere in constructive and destructive fashion with those of the second portion Q such that the beam splitting of the pupil is used to make the wavefronts, mirrored with respect to one another, from portions P and Q interfere.

Here, light that emerges from a hypotenuse face of at least one of the wedge prisms as interfering components of light of the one interferometer branch that was reflected at the beam splitter layer and of light of the other interferometer branch that was transmitted is preferably evaluated.

Expediently, the intensity is detected after the interfering light has emerged from the at least one hypotenuse face (c), a detector in a conjugate pupil being used to this end.

In another variant, following the emergence of the interfering light from at least one of the hypotenuse faces of the wedge prisms of the double wedge prism, the interfering light from the second portion Q of the conjugate pupil can be folded open to form the entire image with the first portion P by means of at least one further double wedge prism, which is opposite the at least one hypotenuse face and disposed downstream thereof, with a hypotenuse face aligned parallel thereto.

In a further variant, following the emergence of the interfering light from the hypotenuse faces of the wedge prisms of the double wedge prism, the interfering light from respectively one portion (U+Tx+R+Sx) or (T−Ux+S−Rx) of the conjugate pupil, which has interfered, can be split into two quarter portions (U+Tx+Ry+Sxy) and (R+Sx−Uy−Txy) or (T−Ux+Sy−Rxy) and (S−Rx−Ty+Uxy) after the double prism in each case, guided in one of the further double wedge prisms within the meaning of a common path interferometer and superposed in constructive and destructive fashion by means of respectively one further double wedge prism, which is arranged with parallel small leg faces rotated through 90° with respect to the respective hypotenuse face of the wedge prism, such that four quarters of further conjugate pupils, which can be composed to make a full pupil image and which have each been made to interfere differently with all quarter portions (R, S, T, U), emerge at the hypotenuse faces of the further double wedge prisms.

In an advantageous embodiment of the method according to the invention, in which the pupil portions are superposed not as mirror images but as images that are rotated through 180° with respect to one another, splitting the pupil beam into complementary portions P and Q of the pupil in the common path interferometer is realized by means of a double wedge prism, guiding respectively one of the two complementary portions P or Q of the pupil as interferometer branches is implemented in separate wedge prisms, wherein an Amici-type roof prism is used in place of at least one of the wedge prisms, said roof prism, for the purposes of forming the wedge prism, being complemented with a complementary prism but being separated therefrom by an air gap, and inverting the complementary portions P and Q is carried out as a rotation in the at least one roof prism by means of two internal reflections of the portions P or Q at roof edges of the one roof prism, and interfering of the light of the at least one of the interferometer branches, reflected twice internally, is implemented at a contact area of the wedge prisms coated with a partly transmissive beam splitter layer, wherein twice reflected light of the one roof prism is superposed on transmitted light of the other wedge prism such that the beam splitting of the pupil leads to the interference of wavefronts, rotated through 180° with respect to one another, of the portions P and Q of the pupil.

Here, particularly advantageously, both wedge prisms can also be replaced by roof prisms with a complementary prism and an air gap in order to produce a full image of the conjugate pupil from the pupil by the interferometer branches with constructive and destructive interference.

Moreover, in an arrangement for improving the resolution or the signal-to-noise ratio of a laser scanning microscope with means for image inversion interferometry, containing means for mirroring a pupil beam in an interferometer branch in order to make a pupil image mirrored at at least one lateral axis interfere with an unchanged pupil image of another interferometer branch, the object is achieved by virtue of the fact that a compact common path interferometer is present, containing at least one double wedge prism made of two right angled, mirror symmetrically arranged wedge prisms, which each are in contact with one another on a large leg face and which have a partly transmissive beam splitter layer therebetween, by virtue of the fact that light from the pupil beam with a pupil of the laser scanning microscope is directed in orthogonal fashion on a small leg face of the wedge prisms in each case, wherein either a first portion P or a second portion Q, complementary to the first portion P, of the pupil of the laser scanning microscope is coupled into the wedge prisms, and by virtue of the fact that the light coupled into the wedge prisms, after total-internal reflection at at least one hypotenuse face of the wedge prism, is steered in the direction of the partly transmissive beam splitter layer and partly reflected and transmitted by the latter and made to interfere with light directed onto the beam splitter layer in the same manner, but opposite thereto, such that, at the beam splitter layer, transmitted and reflected light of the one wedge prism and reflected and transmitted light of the other wedge prism are present for interference purposes as a combination of wavefronts of the first portion P of the pupil of the laser scanning microscope with the second, complementary portion Q of the pupil.

Advantageously, the wedge prisms have such interior angles that light incident in orthogonal fashion at the small leg faces is aligned parallel to the beam splitter layer and parallel to base and cover faces of the wedge prisms, said light undergoes total-internal reflection upon first incidence on the hypotenuse face of each wedge prism and said light is directed in orthogonal fashion on the hypotenuse face upon the second incidence after reflection on the beam splitter layer.

Expediently, the wedge prisms are embodied with interior angles of 90°, 60° and 30° and put together in the double wedge prism to form an equilateral prism.

Preferably, the partly transmissive beam splitter layer situated between the two wedge prisms is embodied as a neutral splitter layer.

Advantageously, the partly transmissive beam splitter layer is applied to one of the wedge prisms and provided as a cemented area for assembling the wedge prisms.

For the purposes of producing a phase difference between the interferometer branches of the common path interferometer, the wedge prisms of the double wedge prism can be displaceable with respect to one another along the beam splitter layer and parallel to the optical axis of the laser scanning microscope in order to be able to easily set the optical path lengths in the two wedge prisms. An alternative option for producing the path difference can be realized by a double wedge in front of, or on, the short leg face of one of the wedge prisms.

In an advantageous embodiment, at least one further double wedge prism is disposed downstream of the double wedge prism and the hypotenuse faces of the double wedge prism and of the at least one further double wedge prism are aligned parallel to one another in order to be able to fold open the light from at least one of the portions (U+Tx+R+Sx) and (R+Sx−Uy−Txy) of the conjugate pupil to form a full pupil image, said light having been made to interfere and emerging from the beam splitter layer through the hypotenuse face.

In a further advantageous embodiment, at least one further double wedge prism is disposed downstream of the double wedge prism in the constructive or destructive interferometer channel and said at least one further double wedge prism has small leg faces rotated through 90° parallel to the hypotenuse face of the double wedge prism in order to superpose the light of two of the portions (U+Tx+R+Sx) and (R+Sx−Uy−Txy) of the conjugate pupil, which has been made to interfere with the beam splitter layer and which emerges through one of the hypotenuse faces, on at least one quarter portion (U+Tx+Ry+Sxy) or (R+Sx−Uy−Txy) or (T+Ux+Sy+Rxy) or (S+Rx−Ty−Uxy).

The pupil or a focal plane image of the laser scanning microscope is provided and imaged in a conjugate pupil or conjugate focal plane image for image inversion interferometry.

The invention is based on the fundamental concept that the lateral increase in resolution of laser scanning microscopes by applying image inversion interferometry with image erection according to a Michelson or Mach-Zehnder interferometer type always suffers from the fact that the exact mirror adjustments are complicated and susceptible to disturbances.

Moreover, during the image split, the ideally equal division of the wavefront (intensity or amplitude split) for a subsequent interferometric combination after an image rotation has taken place relative to one another in the separated interferometer beam paths is problematic. This is because the equivalence of the constructive output and destructive output of the interferometer must lead to two identical perfectly interfering wavefronts that are rotated with respect to one another for reasons of symmetry in the case of an emitting fluorophore on the image axis, with extinction occurring in the destructive beam path and amplification occurring in the constructive beam path. However, in the case of a fluorophore situated along way from the inversion axis, the wavefronts are no longer able to overlap and are not able to interfere with one another either. In this case, the constructive output and destructive output of the interferometer each exhibit 50% signals, which are unable to be superposed in interferometric fashion. Thus, the increase in resolution results only from the interferometric gain of near-axis emitting fluorophores in the case of perfectly rotatedly superposed identical wavefronts.

According to the invention, the demanding stability and adjustment requirements emerging therefrom are mitigated by virtue of a so-called common path interferometer being introduced into the detection beam path of the LSM and half pupil image inversion interferometry (HP-III) being carried out therein. In the process, the wavefront of the descanned light (i.e., light arriving in series by the punctiform scanning of an object with an exposure spot and arriving in a pupil of the LSM) is not divided into two partial beams in the detection path of an LSM unlike in conventional III, where this is implemented in a beam splitter by an intensity division (amplitude split).

Instead, a geometric pupil split (spatial division) is undertaken in the HP-III according to the invention. What is exploited here is the fact that the light distribution in the pupil is symmetric, and hence two pupil halves can be combined with one another in interferometric fashion without a preceding division at the beam splitter, with the half pupils being superposed in mirrored fashion or rotated through 180° with respect to one another about the optical axis. Then, the half pupils are combined in interferometric fashion in a specific beam splitter such that the contents of the two split half pupils are made to interfere in a manner combined with one another. Here, it is irrelevant to the one-dimensional interferometric effect whether the wavefront mirroring occurs in the image plane or in the pupil plane of the optical system since such mirroring has the same effect on the real and Fourier space.

The HP-III is carried out in full by virtue of both the one portion P (preferably a half pupil; however, it may also be designed as a quarter pupil) being made to interfere with the other (complementary) portion Q (of equal size) and also, conversely, the other portion Q being made to interfere with the one portion P. Without loss of generality, half pupils are assumed below for explanatory purposes.

A minimal symmetry deviation is introduced during interference, for example by virtue of the III double wedge prism being slightly offset in the perpendicular direction with respect to the partly transmissive layer of the prism and/or by virtue of being installed at an angle that minimally deviates from the optical axis. As a result, the two outputs are no longer identical; instead, the half pupils P and Qx interfere in constructive fashion in one interferometer channel (interferometer channel C: P+Qx) and the half pupils Q and Px interfere in destructive fashion in the other interferometer channel (interferometer channel D: Q−Px). This result then corresponds to that of the channels C and D in the conventional III approach of measuring both channels and (in the simplest case) subtracting these from one another, and equally leads to a significant increase in resolution and contrast in comparison with the signal of only one of the interferometer channels C or D.

There are a total of four realistic options for setting the minimal symmetry deviation (which are indicated in FIG. 3 by hollow arrows):

an optical double wedge upstream, or on, one of the two wedge prisms of the III double wedge prism, a relative offset of the two partial prisms of the III double wedge prism in relation to one another (along the optical axis), a vertical offset of the partly transmissive layer of the III double wedge prism in relation to the optical axis, a small pitch angle of the III double wedge prism in relation to the optical axis about an axis orthogonal thereto (e.g., x-direction in the case of the optical axis along the z-direction).

However, for the second specified option, the premise that the two wedge prisms are not cemented to one another or only adhesively bonded to one another after the horizontal offset has been set along the optical axis applies.

The invention explained above yields a simple realization of half pupil image inversion interference (HP-III), which facilitates an adjustment that is both easy to carry out and also very stable, and which moreover has low production costs. The specific prism arrangement of the III double wedge prism has already been specified above.

The arrangement according to the invention facilitates a simplified solution for increasing the resolution in laser scanning microscopes (LSM) by way of image inversion interferometry (III), in which the III principle, realized in a shortened, stable common path interferometer as half pupil interference (HP-III), has a simplified adjustment and lower sensitivity in relation to external disturbance effects (e.g., temperature, vibrations, etc.) and causes lower production costs. Moreover, the invention circumvents the equal division of the wavefront (intensity split) that is required in the prior art and replaces this with a pupil area split (or spatial beam split), which is more easily adjustable to a significant extent.

BRIEF DESCRIPTION OF THE DRAWINGS

Below, the invention will be explained in more detail on the basis of exemplary embodiments. To this end, in the drawings.

DETAILED DESCRIPTION OF THE PREFERRED EMBODIMENTS

Figure 1:
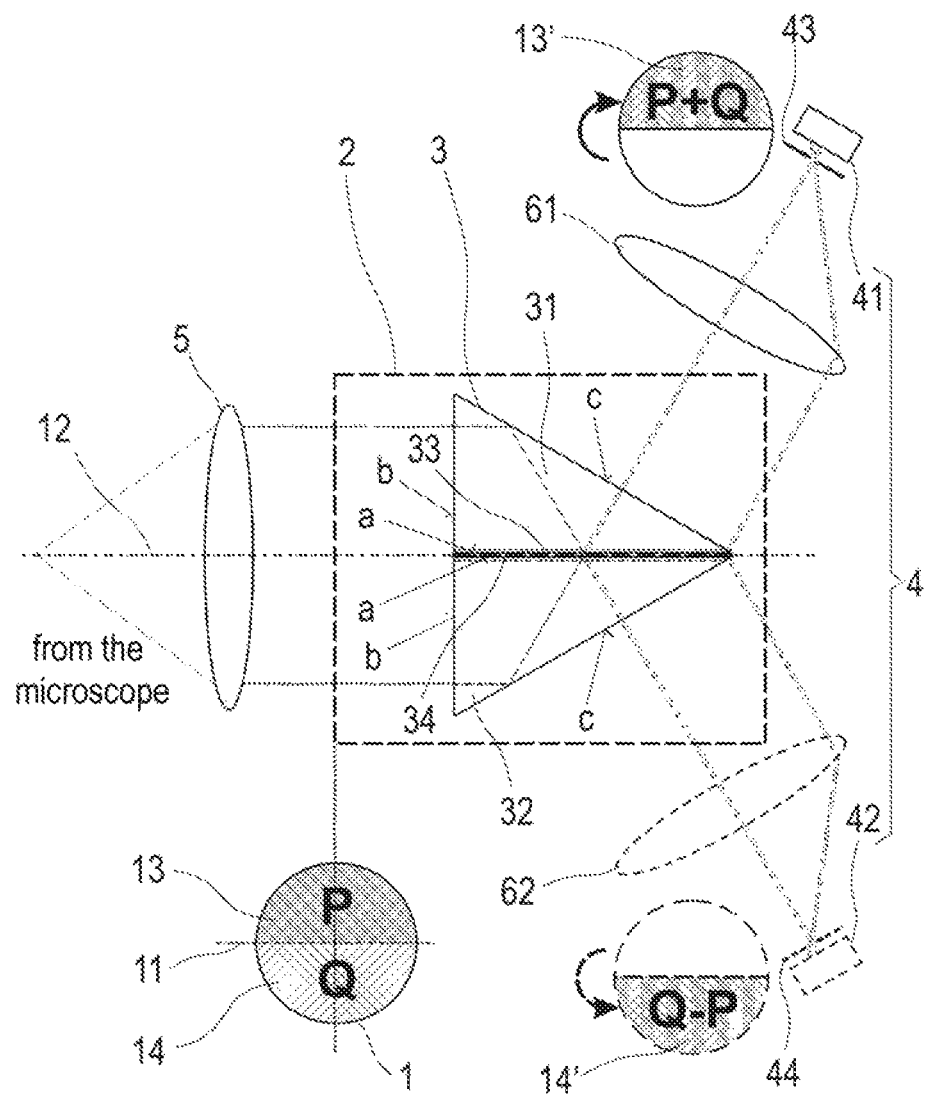
FIG. 1 shows a schematic illustration of an LSM detection beam path with half pupil image inversion interferometry (HP-III) according to the invention in a common path interferometer.

The invention, intended to be referred to as half pupil image inversion interferometry (HP-III) on account of the preferred embodiment, is illustrated in FIG. 1 for a confocal laser scanning microscope (LSM), wherein a pupil 1 of the detection beam path of the LSM is coupled into a shortened common path interferometer 2, which is shown in a basic version with a double wedge prism 3 (also referred to as HP-III prism below), and imaged on at least one optoelectronic receiver 4. For the benefit of the typical confocal evaluation of the LSM, respectively one pinhole 43 or 44 is preferably arranged in front of a first detector 41 and, where applicable, a second detector 42. In the one-dimensional case (line scan), the pinhole can ideally be a line pinhole (not plotted) that is matched to the line illumination, i.e., has a slot in place of a hole. Then, the receiver 4 would ideally be a linear detector 41 (line detector), which resolves the line with spatial resolution in the image space.

For the one-dimensional interferometric effect of wavefront combination, i.e., where there is mirroring in a lateral direction only, it is completely irrelevant whether the wavefront mirroring occurs in the focal plane or in the pupil plane of an optical system since such mirroring has the same effect on real and Fourier space. Therefore, the assumption is made here without loss of generality that the mirroring on the double wedge prism 3 occurs in a collimated beam downstream of an output pupil of the LSM.

The underlying principle of the invention should initially be explained on the basis of FIG. 2.

Figure 2A:
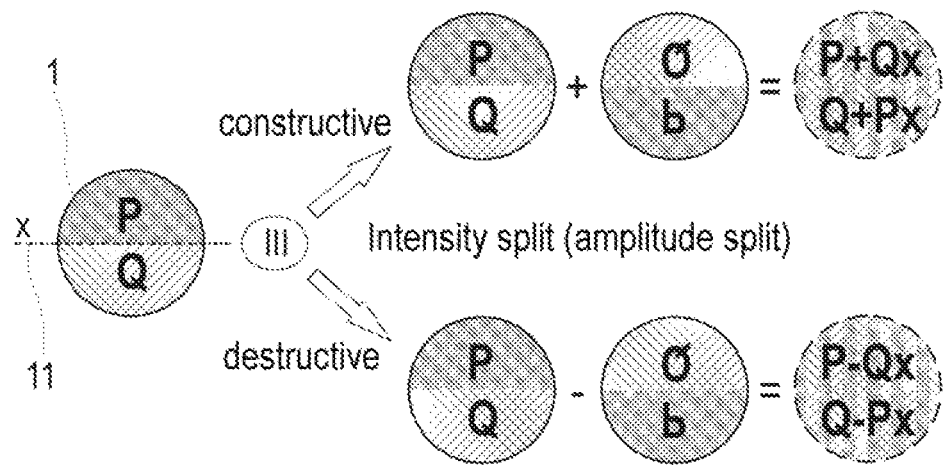
FIG. 2A shows a schematic illustration of conventional image inversion interferometry (III), considering two pupil portions P and Q in view of the invention for the purposes of explaining the redundant information content in the interfering half pupils after combining the respective intensity-split unchanged and inverted wavefront of the entire pupil.

If, in FIG. 2A, mirroring of the pupil 1 which is always implemented as wavefront mirroring of the whole pupil of a first partial beam with the unmirrored wavefront of the whole pupil of a second partial beam in conventional III (by means of intensity splitting by means of a neutral divider) is considered with reference to the invention by virtue of subdividing the pupil 1 into two portions P and Q at a horizontal axis 11, which orthogonally crosses the optical axis 12 of the LSM, it is possible to see that, in conventional III, the portion P (=half pupil HP 13 in HP-III) is made to interfere with the portion Q (=HP 14 in HP-III) and, conversely, the portion Q is made to interfere with the portion P. Since both portions P and Q on account of the symmetry of the pupil image information and with possible asymmetric aberrations being neglected contain the same wavefront components, information redundancy of the portions P and Q is consequently represented. Here, the different types of crosshatching serve to visually symbolize the mirrored and finally interfered wavefront components of the two complementary pupil regions P and Q. For the information content present, it is therefore enough only to make portions P and Q interfere as half pupils 13 and 14 and consequently, according to the invention, dispense with an intensity split (=amplitude split) of the wavefronts in the entire pupil 1. Therefore, instead of splitting the amplitude of the wavefront of the pupil 1, the invention carries out a spatial division of the pupil 1 into two half pupils 13 and 14 by means of the double wedge prism 3 (as shown in FIG. 1).

Figure 2B:
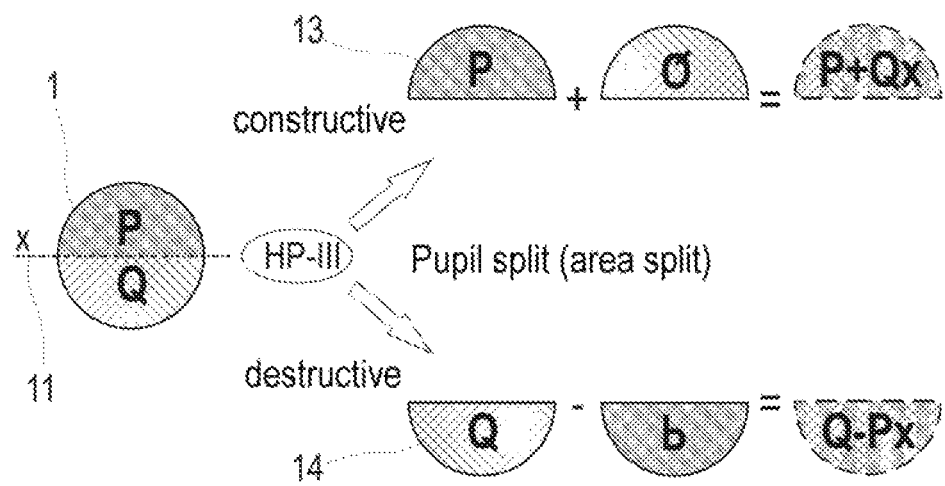
FIG. 2B shows a schematic illustration of the principle (HP-III) according to the invention with a pupil that has been divided into two half pupils, respectively one of which, which is mirrored or rotated, has been made to interfere with the other unchanged half pupil.

In contrast to FIG. 2A, a half pupil 13 according to FIG. 2B can thus be superposed on the other half pupil 14 in mirrored fashion (i.e., after single mirroring at a laterally aligned x-axis, drawn here as a horizontal axis 11) for interference purposes. Qualitatively, the result of FIG. 2B, the half pupil superposition of HP 13 on HP 14, is the same as the upper area component P+Qx in the right illustration of FIG. 2A (after making the wavefronts split from the entire pupil 1 interfere). Said upper area component, in turn, equals the lower area component Q+Px, which corresponds to the half pupil superposition of HP 14 on HP 13. It is important to mention here that, according to the invention, different phase signs have to be produced in the two interferometer channels C and D for constructive and destructive superposition of the wavefronts, such as, e.g., P+Qx in C and P−Qx in D, in order to achieve interference with gain during the superposition, said interference simply being produced by path length differences in the two separate partial beams during the interference of the complete pupil images, superposed by mirroring, of FIG. 2A according to conventional III.

While the exact amplitude split of the wavefront split according to conventional III (FIG. 2A) causes significant outlay and is very susceptible to errors, the spatial image split of the pupil 1 into half pupils 13 and 14 according to the invention can be realized much more easily and, ultimately, the interference of the half pupils 13 and 14 can yield the same result in analogous fashion.

The realization of the spatial image split into the two half pupils 13 and 14 is explained once again below with reference to FIG. 1.

FIG. 1, left, illustrates a pupil 1 of the detection beam path of an LSM in stylized fashion, with a subdivision into two portions P and Q being undertaken along a horizontal axis 11, which laterally crosses the optical axis 12 of the LSM. In the case of a conventional assignment of a Cartesian coordinate system in the beam path of the LSM with the optical axis 12 lying in the z-direction, the horizontal coordinate is declared as the x-direction and the vertical coordinate is declared as the y-direction. Without loss of generality, this assignment is assumed below for labeling the pupil components.

Ideally, the light coming from the microscope is collimated by a collimation optical unit 5 such that a pupil 1 forms downstream of the collimation optical unit 5. Then, the collimated light is directed into the shortened common path interferometer 2. Here, the generated pupil 1 may be situated upstream, in or else downstream of the interferometer.

However, the collimation optical unit 5 need not perfectly collimate the beam either; all that is required is for the beam at least not to be trimmed within the common path interferometer 2. This means that slightly divergent and convergent beams are likewise accessible to HP-III.

Furthermore, parts of the microscope may also already act as collimation optical unit 5. What can be exploited in the process is that modern microscopes often have objective lenses corrected to infinity, and so the light is already present in collimated fashion and the common path interferometer 2 can already be positioned in the collimated beam between objective lens and tube lens of the microscope or else can be arranged directly following the tube lens of the microscope provided the aforementioned beam trimming does not occur.

In this embodiment, the common path interferometer 2 contains a double wedge prism 3, which is composed of two rectangular wedge prisms 31 and 32 that are arranged in a mirror symmetrical fashion, wherein the large leg faces a of the two wedge prisms 31 and 32 are in contact with one another and a partly transmissive beam splitter layer 34 is applied to one of these leg faces a. Preferably, the two large leg faces a of the wedge prisms 31 and 32 are adhesively bonded to one another as cemented faces and thus produce a compact and stable common path interferometer 2.

The common path interferometer 2 is shortened to the extent that it does not have an input beam splitter, which is conventional in III and performs a split into two interferometer branches. In the employed double wedge prism 3, two adjacent input faces in the form of the small leg faces b of the wedge prisms 31 and 32 lie in the collimated beam of the pupil 1. These small leg faces b represent the input faces of the separate interferometer branches and receive one of the half pupils 13 and 14 (as complementary portions of the pupil 1) in each case.

Within the interferometer branches defined thus, there is an image inversion by total-internal reflection at the hypotenuse face c of each wedge prism 31 and 32. Then, the reflected light components of the half pupils 13 and 14 are steered onto the partly transmissive beam splitter layer 34 from opposite sides, said beam splitter layer preferably being a neutral splitter layer, and the components having undergone total-internal reflection in the wedge prism 31 are made to interfere with the transmitted components of the wedge prism 32 from there, while the components having undergone total-internal reflection in the wedge prism 32 interfere with the transmitted components of the wedge prism 31.

As a result of twofold mirroring, the half pupil 13 remains virtually unchanged in the wedge prism 31 and said half pupil is made to interfere with the component of the half pupil 14 that has been reflected once in the wedge prism 32 and that has passed through the beam splitter layer 34 such that the resultant half pupil combination P+Qx is recorded by a first detector 41 via a focusing optical unit 61. However, if desired, the other half pupil combination P−Qx is likewise available and can be additionally recorded via a focusing optical unit 62 by way of a second detector 42 (illustrated using dashed lines). Like in conventional III, the information of the complete pupil 1 is available "in interferometrically convolved fashion" in each interferometer channel C and D. What is important here for a desired increase in resolution by way of a further combination by calculation of the signals is that there is a change in the sign of the interference P+Qx and P−Qx in the two interferometer channels C and D.

Initially, a very simple implementation of the method of the half pupil combination with a small improvement in the resolution, which is both achievable with low production costs and also easily and stably adjustable, is rendered possible by the recognition that causing interference of the area component P with Q of the half pupils 13 and 14 only once is sufficient for the purposes of extracting the information content of the whole pupil 1.

However, as explained below, the decisively improved resolution can be achieved by using both interference channels C and D, in which a phase difference of the wavefronts of the half pupils 13 and 14 is set in a targeted manner by a path length change within the wedge prisms 31 and 32.

Figure 3:
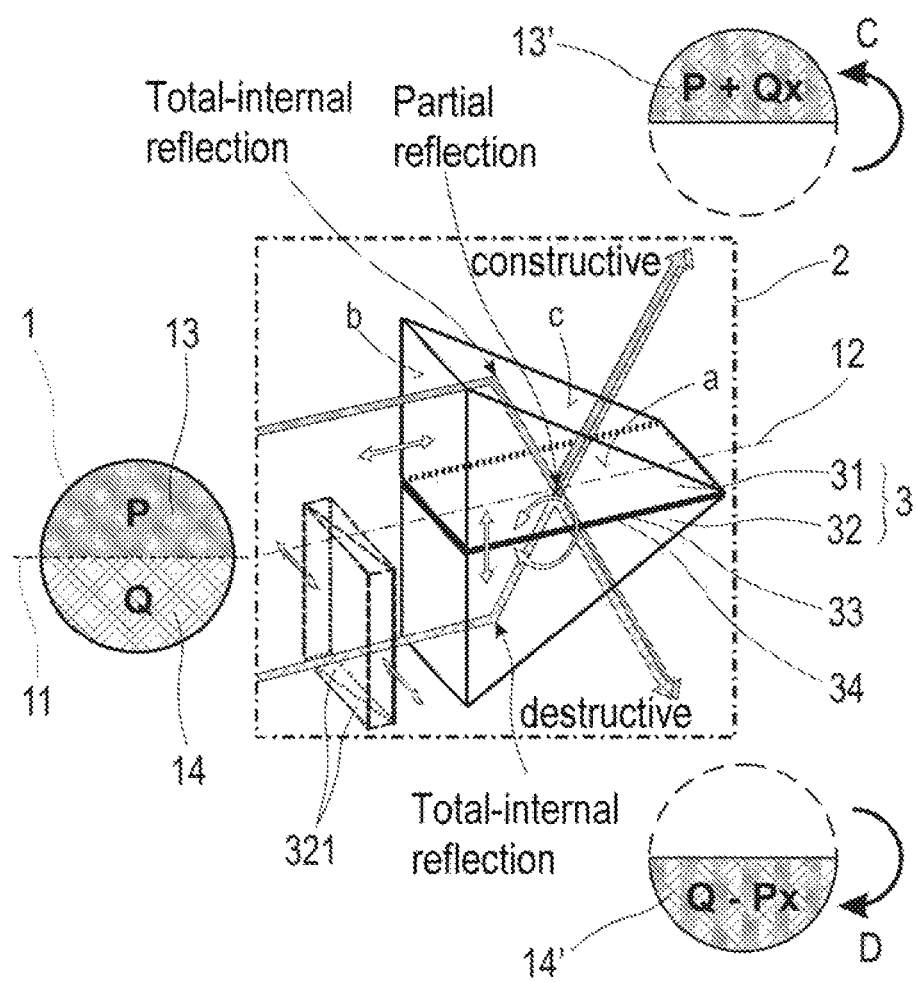
FIG. 3 shows a schematic illustration of a first embodiment of beam splitting and wavefront combining according to the invention, containing an equilateral HP-III prism with a partly transmissive beam splitter layer between the large leg faces of the two rectangular wedge prisms and the adjustment options thereof for setting a symmetry deviation in the case of the interferometric superposition.

FIG. 3 shows the preferred implementation option, which consists of a single HP-III prism (double wedge prism 3), in which two wedge prisms 31 and 32 are in contact with one another in mirror symmetrical fashion, wherein a beam splitter layer 34 in the form of a partly transmissive neutral splitter layer is situated on the large leg face a of one of the two wedge prisms 31 and 32. The interior angles of the wedge prisms 31 and 32 are chosen in such a way that light with perpendicular incidence, i.e., light that is incident parallel to the beam splitter layer 34 and parallel to base and cover faces (not labeled as these are parallel to the plane of the drawing, thereabove and therebelow) of the wedge prisms 31 and 32, undergoes total-internal reflection upon the first incidence on the hypotenuse face c of each wedge prism 31 and 32 and, after the second incidence on the beam splitter layer 34 (i.e., after transmission through the latter), strikes the hypotenuse face c of the respective other wedge prism 32 and 31 in orthogonal fashion in order to be able to leave the respective wedge prism 31 and 32 without dispersive effects. Consequently, the interior angles of the wedge prisms emerge as 30°, 60° and 90°, with the large leg faces a with the beam splitter layer 34 therebetween being in contact with one another without being rigidly connected (adhesively bonded) to one another by way of a cemented layer 33. In the small leg faces b, which are arranged in a plane orthogonal to the optical axis 12 of the detection beam path of the LSM, the light of the pupil 1, provided it originates from the focal plane of the LSM, is input coupled in collimated fashion.

The pupil beam coming from the LSM is divided into an upper and lower half pupil 13 and 14 by the geometry of the double prism 3 and the position thereof with the beam splitter layer 34 in a plane spanned by the horizontal axis 11 and the optical axis 12. A division into a left and right half pupil in the case of an axis 15 perpendicular to the optical axis 12 (only plotted in FIG. 5) or else any other alignment would also equally be possible since, apart from the alignment on the preferably introduced coordinate system, there are no system-caused preferred directions.

By way of the total-internal reflection at the respective hypotenuse faces c of the wedge prisms 31 and 32, the two half pupils 13 and 14 are reflected in the direction of the beam splitter layer 34, after which they interfere with one another.

In order to achieve the desired resolution increase, it is important to set the two interferometer channels C and D in constructive and destructive fashion within their meaning in III. In order to produce a small wavefront shift during the interference by deviations in the run-through optical path lengths between the two wedge prisms 31, 32, at least one of the following options can be applied as easily implementable adjustment settings:

a relative offset of the two wedge prisms 31, 32 of the double wedge prism 3 relative to one another (along the optical axis 12), an optical double wedge 321 at the input of one of the two partial prisms 31, 32 of the double wedge prism 3, wherein at least one wedge of the double wedge 321 is displaceable in lateral fashion (parallel to the direction of the x-axis) in order to produce a small wavefront retardation in the wedge prism 32 in relation to the uninfluenced wedge prism 31 in this example, a vertical offset of the partly transmissive layer 34 of the double wedge prism 3 in relation to the optical axis 12, a small pitch angle of the double wedge prism 3 in relation to the optical axis 12 about a horizontal axis (x-direction).

In FIG. 3, each of these options is indicated by hollow arrows, even though only at least one of these needs to be used.

The first adjustment option, which realizes a relative offset of the two wedge prisms 31 and 32 with respect to one another along the optical axis 12 in the double wedge prism 3, is a measure that assumes that the wedge prisms 31 and 32 cannot be rigidly connected to one another by a cemented layer 33 along the beam splitter layer 34. In this respect, the mirror faces at the hypotenuse faces c of the wedge prisms 31 and 32 are no longer rigidly affixed with respect to one another; instead, only the second mirror face of the beam splitter layer 34 still remains unchangeable in the common path interferometer 2. Even though both wedge prisms 31 and 32 in FIG. 3 should be understood as being selectively movable along the optical axis 12, it should be assumed to be preferred that, for a simple adjustment, one wedge prism 32 is securely installed while the other wedge prism 31 can slide thereon only in horizontal fashion in the direction of the optical axis 12. As a result, the adjustment remains restricted to a one-dimensional movement only and the common path interferometer 2 remains configured virtually affixed in relation to the LSM apart from a path length change in one of the interferometer branches. As a result of this measure of shifting the wedge prisms with respect to one another, the optical path lengths up to the beam deflection within the two wedge prisms 31, 32 become slightly different (as a result of total-internal reflection at the respective large leg faces).

The same effect is achieved by the optical double wedge 321, which is plotted upstream of the wedge prism 32 in FIG. 3 even though it can also be directly attached to one of the prisms 31, 32.

The double wedge prism 3 can be set by a displacement orthogonal to the horizontal pupil axis 11 and to the optical axis 12 in such a way that one of the outputs is constructive and the other is destructive. Consequently, the adjustment of the compact common path interferometer 2 in the form of the double wedge prism 3 is restricted to a simple one-dimensional linear movement of same, with the two interferometer branches being fixed among themselves and being reduced to two mirror faces.

A deviation from the symmetry in the interferometer channels C and D of the common path interferometer 2 (only denoted in FIG. 1) can likewise be achieved by rotating the double wedge prism 3 through a small angle (e.g. a "pitch angle" in relation to the direction of the optical axis 12) about a lateral axis 11 (e.g., horizontal x-axis) orthogonal to the optical axis 12, said small angle producing a symmetry deviation in analogous fashion to a phase difference of the wavefront in the half pupils 13 and 14. In this adjustment variant, too, setting the double wedge prism 3 is restricted to varying an angle while the interferometer branches remain restricted to two mirror faces that are fixedly set in relation to one another.

As a result of the double prism arrangement as illustrated in FIG. 3, one pupil half is mirrored along the separation line (along a horizontal axis 11 in this case) onto the other pupil half and these are made to interfere. The III effect which increases the resolution only arises in the dimension perpendicular to this line; i.e., it is a one-dimensional increase in the resolution.

An isotropic increase in resolution (in all directions) can be achieved without having to perform modifications on the wedge prisms by virtue of at least one further image being recorded, in which the double prism is rotated about the optical axis such that the resolution-increasing effect acts in another dimension. The images recorded thus can be combined to form a single image on a computer, said single image having an improved resolution in all lateral directions.

Pupil Doubling

Figure 4:
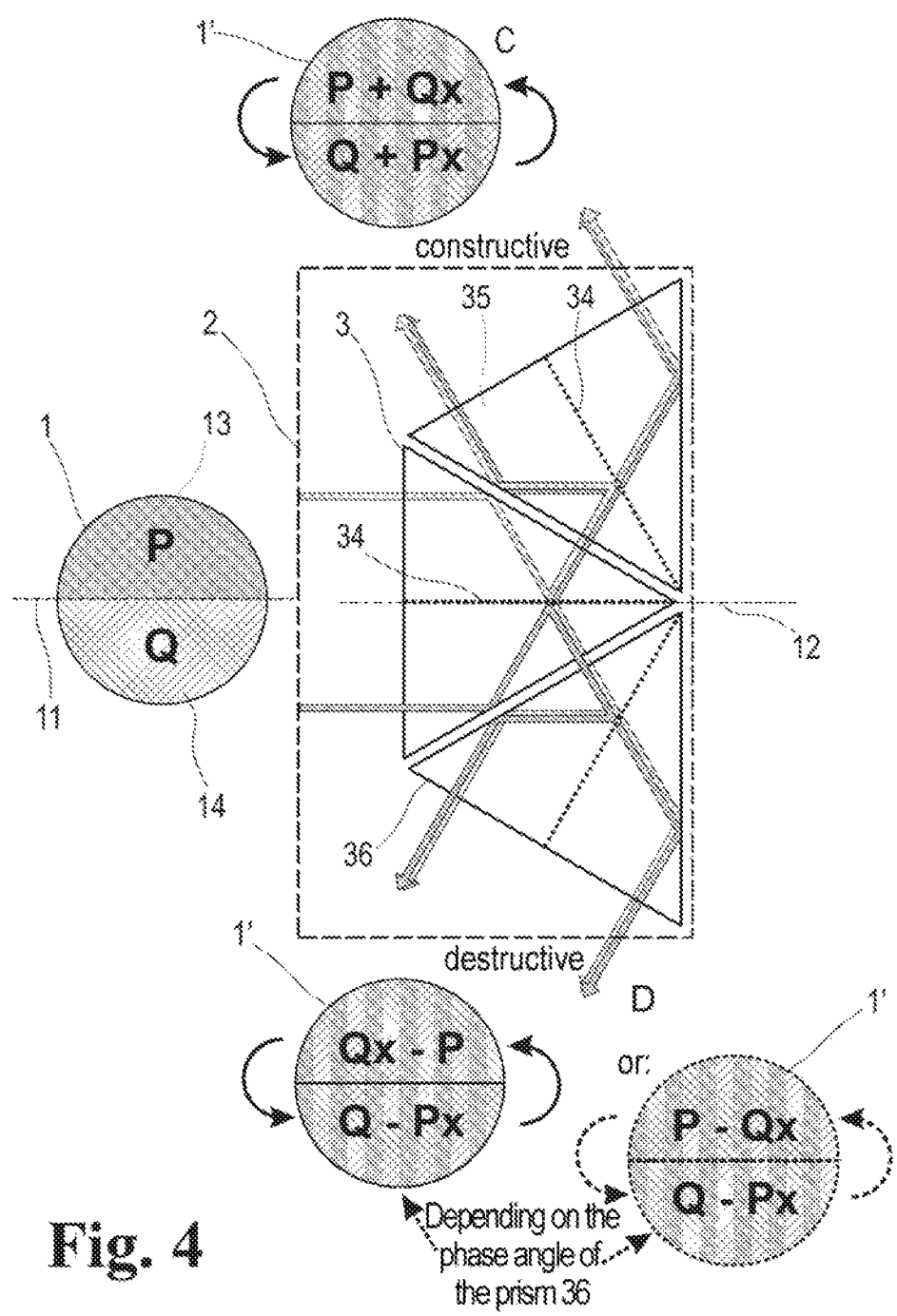
FIG. 4 shows a schematic illustration of a second embodiment of the invention with at least one further double wedge prism for reconstructing the pupil by doubling the half pupils.

Even if half of the pupil information in conventional III is redundant, having a full pupil 1' available after the light has passed through the common path interferometer 2 may also be advantageous in HP-III by virtue of selected here the half pupil 14 being filled up by being folded open (mirrored on itself) or by the half pupil 13 being input coupled (not shown). This may be expedient if the outputs of the common path interferometer 2 should be imaged onto a pinhole 43 or 44 (only plotted in FIG. 1) in order to obtain optical depth resolution (sectioning). FIG. 4 shows this option of obtaining such pupil doubling with identically constructed further double wedge prisms 35 and 36. Here, the further double wedge prisms 35 and 36 are arranged on both sides of the HP-III prism 3 with hypotenuse faces parallel to one another in the same plane in such a way that said further double wedge prisms are passed through in reverse, as a result of which splitting and folding open arises instead of folding together and interferometric combination, corresponding to the desired half pupil doubling.

Figure 5A:
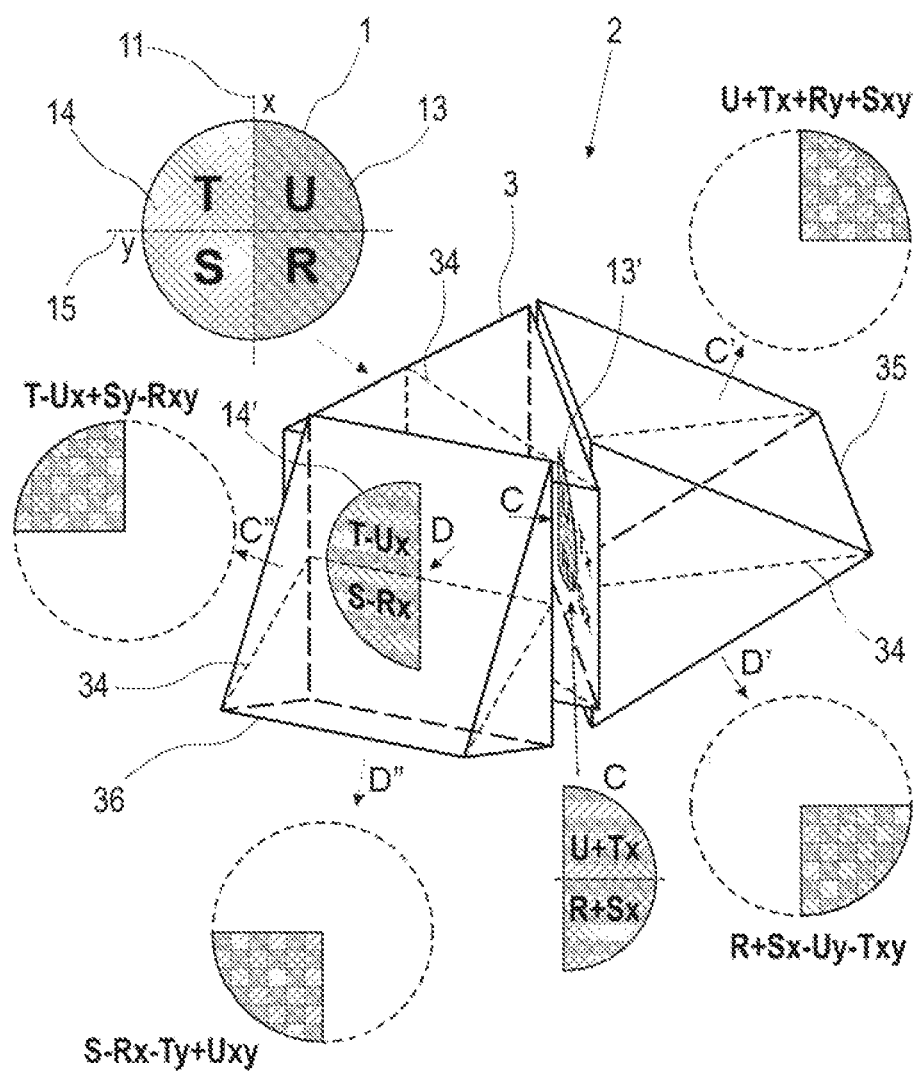
FIG. 5A shows an arrangement of three HP-III prisms with the further double wedge prisms being arranged twisted through 90° in relation to the HP-III prism.
Figure 5B:
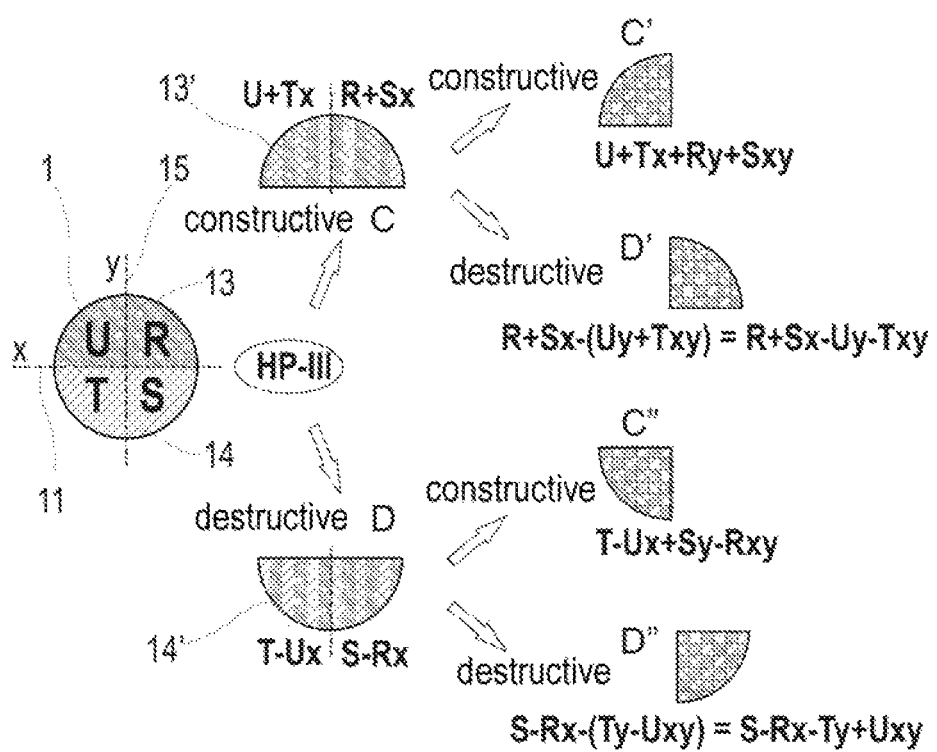
FIG. 5B shows the results of the individual interferometer channels C and D, C', D' and C", D"

As described above, a twofold application of the wavefront mirroring can be used for a wavefront inversion. To this end, FIG. 5A shows an arrangement of three HP-III prisms 3, with the further double wedge prisms 35 and 36 being arranged twisted through 90° in relation to the HP-III prism 3. Here, the wavefront is mirrored successively on two mutually orthogonal axes, with a wavefront inversion as a consequence. Here, quarters of the entire pupil 1 arise as a consequence of the double reflection (=inversion), said quarters however facilitating the laterally two-dimensional improvement in the resolution of the LSM. To this end, FIG. 5B once again schematically shows the results of the individual interferometer channels C and D and also C', D' and also C", D" (following the further double wedge prisms 35 and 36) according to the arrangement of FIG. 5A. Here, the complete pupil image can be produced as a twofold interfered conjugate pupil 1' by assembling the twofold superposed quarter pupils, should this be required for further processing of the LSM images.

In conventional III, the pupil 1 is split at a beam splitter and the individual paths are rotated relative to one another through 180° about the pupil center. In order to realize an equivalent case for a half pupil III, the respective pupil halves must be rotated through 180° about the pupil center onto the other pupil half, instead of being mirrored at a line (e.g., the horizontal axis 11).

Since a rotation through 180° can be equivalently achieved by way of two instances of mirroring at mutually perpendicular axes, the desired rotating of the pupil contents onto one another can be realized by virtue of one of the two pupil halves 13, 14 experiencing additional mirroring about an axis perpendicular to the separating line of the horizontal axis 11.

Figure 6:
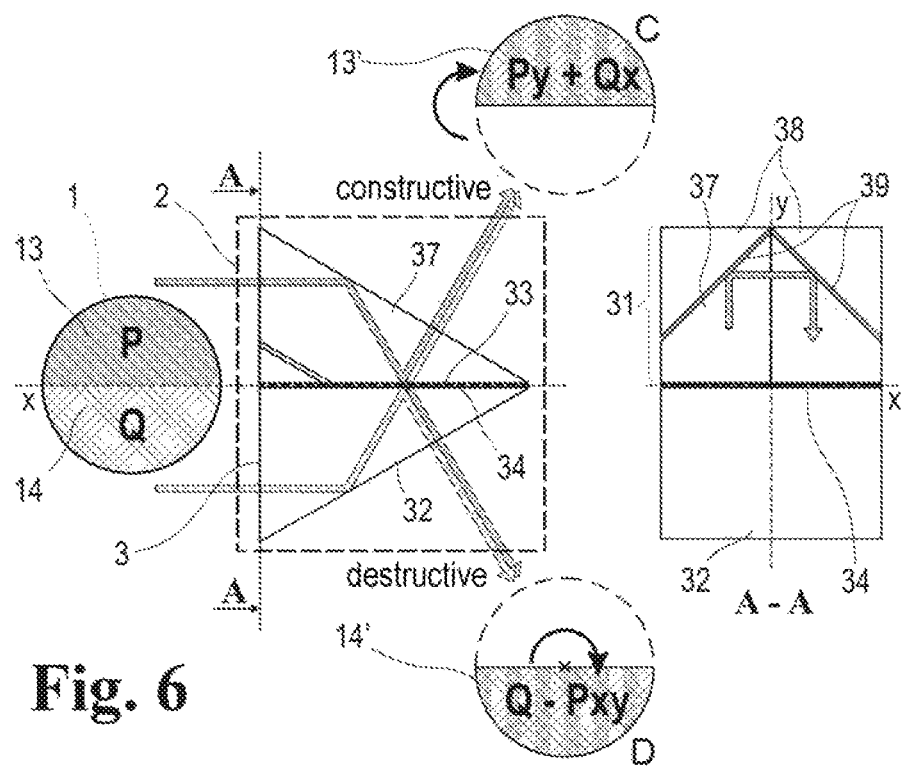
FIG. 6 shows a schematic illustration of a prism arrangement.
Figure 7:
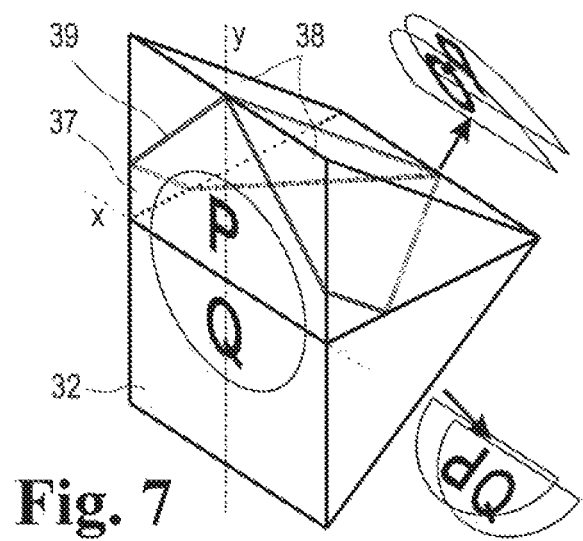
FIG. 7 shows a schematic illustration of a prism arrangement.

This variant is illustrated in FIG. 6 and FIG. 7. One of the two wedge prisms 31, 32, specifically the wedge prism 31 in this case, is modified to this end by virtue of the plane hypotenuse face c described in the previous examples being replaced by a roof-shaped double face (with an included right angle), the "roof edge" of which extends along a centerline of the original hypotenuse face c and strikes the optical axis 12. The consequently employed roof prism 37 is an Amici-type prism, in which there are two reflections at the two roof faces of the roof prism 37 according to FIG. 6 instead of the single reflection at the hypotenuse face c of the wedge prism 31 (according to FIGS. 1-5), said two reflections, in addition to the original reflection, also leading to a further desired reflection, by means of which a rotation of the half pupil 13 through 180° about the optical axis 12 is produced.

The angle of the roof edge above the optical axis 12 is chosen in such a way that not only are the necessary geometric instances of mirroring satisfied but total-internal reflection also occurs at the prism-air interfaces of the roof faces of the roof prism 37.

Figure 8A:
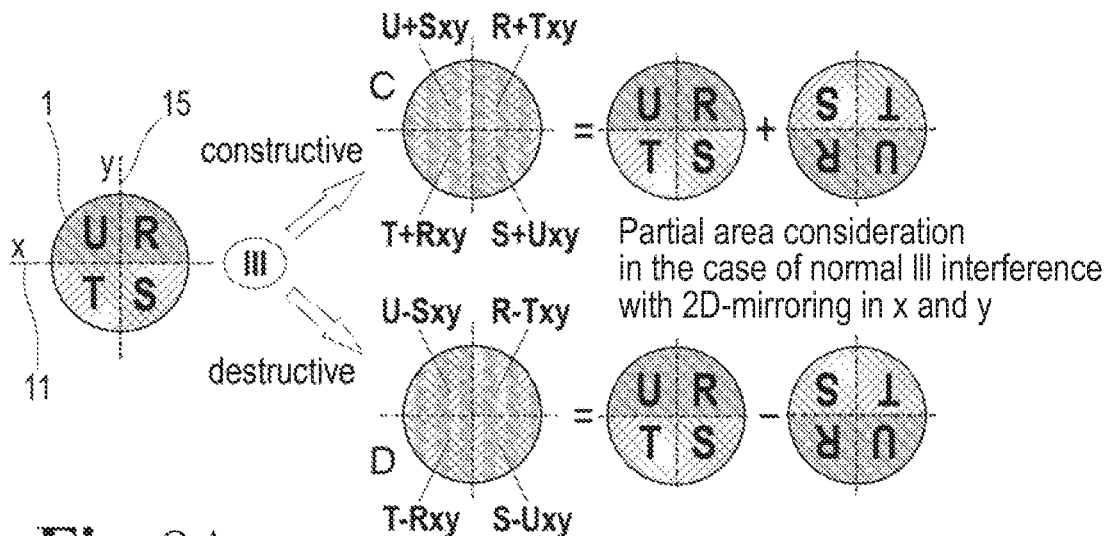
FIG. 8A shows a superposition scheme.

Like in the previous examples, following the unification of the half pupils 13 and 14 at the beam splitter layer 34, the angle of incidence in relation to the emergence faces of the roof prism 37 in the embodiment according to FIG. 6 and FIG. 7 is also steep enough so that there is no total-internal reflection here; instead, the light is able to leave the roof prism 37. Since, in contrast to the 90° emergence from the original hypotenuse face c of the wedge prism 31, the light reflected at the beam splitter layer 34 (just like the light transmitted from the wedge prism 32 through the beam splitter layer 34) does not strike the roof faces of the roof prism 37 in orthogonal fashion, said light would experience a beam deflection according to Snell's law upon emergence. In order to prevent this, the original prism form of the wedge prism 31 is reestablished by filling up the roof prism 37 with an additional complementary prism 38 (with the same refractive index as the roof prism 37). What should be observed here is that an air gap 39 (or a gap filled with a material with a lower refractive index) remains between the roof prism 37 and the complementary prism 38 so that the above-described total-internal reflections remain possible and Snell-type refraction during the light emergence from the roof prism 37 is immediately undone by the reentry into the complementary prism 38. As can be seen in a side view and a front view in the direction of the optical axis 12 of the common path interferometer 2 in FIG. 6, the half pupil 13 is effectively rotated through 180° about the optical axis 12 by means of two instances of mirroring about two mutually orthogonal axes 11 and 15 that are lateral to the optical axis 12 and said half pupil 13 is superposed on the image of the half pupil 14', which was mirrored once on the x-axis (lateral axis 11). FIG. 7 elucidates these circumstances in a perspective view with a stylized illustration of the imaged half pupils 13' and 14' for the constructive and the destructive interferometer channel C and D, respectively. The associated superposition scheme is illustrated in FIG. 8B and contrasted to the superposition scheme of conventional III (FIG. 8A).

The consideration of the superposition scheme of III is subdivided into two half pupils and four quarter pupils R, S, T, U from the vantage point of the invention (HP-III), even though it is always the entire pupil 1 that is rotated (or mirrored in 2-dimensional fashion at orthogonal axes) in III.

Figure 8B:
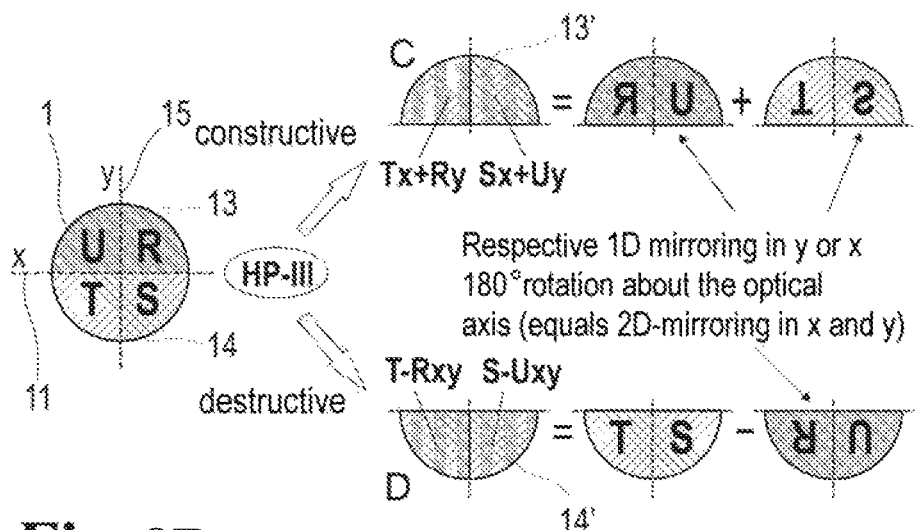
FIG. 8B shows a superposition scheme.

In FIG. 8B, the superposition scheme of the interferences in the common path interferometer 2 is illustrated as a result image. What becomes clear from the comparison with FIG. 8A is that conventional III superposes redundant quadrant images, which are completely equivalent. Here, the superposition scheme of HP-III (FIG. 8B) is identical to that of the corresponding pupil half of III (FIG. 8A) in the destructive interferometer channel D. In the constructive interferometer channel C, the superposition scheme of HP-III is merely mirrored one more time about the x-axis 11 in comparison with III; however, this has no influence on the signal detected in the constructive interferometer channel C. For the purposes of superposing the two interferometer channels C and D, the half pupil imaging 13' however needs to be made congruent with the half pupil imaging 14' of the destructive interferometer channel D after having been mirrored about the x-axis 11 anyway, as a result of which the constructive interferometer channel C, as (T+Rxy, S+Uxy), is identifiable as corresponding to the illustration of FIG. 8A.

Should the complete image of the pupil 1 (conjugate pupil 1') be required like in the first exemplary embodiment according to FIG. 4 or like in the double HP-III variant according to FIG. 5A, the second wedge prism 32, too, can be replaced by a roof prism 37 and a complementary prism 38 in order also to realize, in the constructive interferometer channel C, the superposition of the half pupil 13, having been mirrored at the x-axis, with the half pupil 14 rotated through 180°. Consequently, the complete superposition situation of the wavefronts is adjustable from all pupil portions like in conventional III and realizable with a significantly higher stability.

Extended Depth of Field

Even though the HP-III effect (like the conventional III effect) has no axial resolution on its own, a suitable illumination (e.g., by means of a Bessel beam) allows the realization of a scanning mode which obtains an axial sum projection with a high lateral resolution and a high signal-to-noise (SNR) ratio by way of purely a 2D scan.

Consequently, half-pupil image inversion interferometry (HP-III) according to the invention, whose pure area division of the pupil 1 (spatial division of the pupil beam) allows a much more stable and more easily adjustable wavefront superposition than an intensity split (amplitude split) of the wavefronts in the case of conventional III, is very well-placed to increase the lateral resolution in an LSM system, improve the SNR and significantly reduce the susceptibility to errors in relation to ambient influences. As a result of additional measures, the increased lateral resolution can also be transferred to the axial resolution during so-called sectioning.

LIST OF REFERENCE NUMERALS

1 Pupil
1' Conjugate pupil (pupil image)
11 Lateral axis (x-axis)
12 Optical axis
13, 14 Half pupil
13', 14' Half pupil image
15 Lateral axis (y-axis)
2 Common path interferometer
3 HP-III prism (double wedge prism)
31, 32 Wedge prism
321 Optical double wedge
33 Cemented layer
34 Partly transmissive beam splitter layer (neutral splitter layer)
35, 36 Further double wedge prism
37 Roof prism
38 Complementary prism
39 Air gap
4 Receiver
41, 42 First, second detector
43, 44 Pinhole
5 Collimation optical unit
61, 62 Focusing optical unit

What is claimed is:

1. A method for improving the resolution or the signal-to-noise ratio of a laser scanning microscope by means of image inversion interferometry, in which a pupil beam in an interferometer branch is mirrored at least once in order to make wavefronts of a pupil image mirrored at at least one axis and of an unmodified pupil image of another interferometer branch interfere, including the steps of:
   coupling the pupil beam coming from the laser scanning microscope into a common path interferometer,
   splitting the area of a pupil from the pupil beam along a defined axis that is lateral to an optical axis of the collimated beam into two complementary portions P and Q of the pupil under the production of two partial beams that are guided in mirror symmetric fashion along the common path interferometer as two interferometer branches aligned lying opposite one another along the optical axis and that are separately supplied to at least one beam deflection means by way of total-internal reflection,
   making the light of the interferometer branches interfere at a partly transmissive beam splitter layer after the at least one beam deflection, wherein light of the one interferometer branch, transmitted by means of the beam splitter layer, and reflected light of the other interferometer branch, and vice versa, form a combination of wavefronts of a first portion P with a second portion Q, complementary to the first portion P, of the pupil, and vice versa, such that constructive interference C and destructive interference D of the wavefronts of the two interferometer branches are producible from the two different portions P and Q of the pupil, and
   detecting information of the two complementary portions P and Q of the pupil, which pupil images are interferometric folded inversely to receive complete information of the full pupil area by using both interferometer branches adjusted with a defined phase difference.

2. The method as claimed in claim 1, wherein splitting the pupil beam into complementary portions P and Q of the pupil in the common path interferometer is realized by means of a double wedge prism such that one of the two complementary portions P or Q is respectively guided in separate wedge prisms as interferometer branches with at least one internal reflection and the interference of the internally reflected light of the interferometer branches is brought about at a contact area, coated with the partly transmissive beam splitter layer, of the wedge prisms, wherein light of the one wedge prism, transmitted by the beam splitter layer), is superposed on reflected light of the other wedge prism and reflected light of the one wedge prism is superposed on transmitted light of the other wedge prism and wavefronts of the first portion P are made to interfere in constructive and destructive fashion with those of the second portion Q such that the beam splitting of the pupil is used to make the wavefronts, mirrored with respect to one another, from portions P and Q interfere.

3. The method as claimed in claim 1, wherein light that emerges from a hypotenuse face of at least one of the wedge prisms as interfering components of light of the one interferometer branch that was reflected at the beam splitter layer and of light of the other interferometer branch that was transmitted is evaluated.

4. The method as claimed in claim 3, wherein the intensity is detected after the interfering light has emerged from the at least one hypotenuse face, a detector in a conjugate pupil being used to this end.

5. The method as claimed in claim 3, wherein, following the emergence of the interfering light from at least one of the hypotenuse faces of the wedge prisms of the double wedge prism, the interfering light from the second portion Q of the conjugate pupil is folded open to form the entire image with the first portion P by means of at least one further double wedge prism, which is opposite the at least one hypotenuse face and disposed downstream thereof, with a hypotenuse face aligned parallel thereto.

6. The method as claimed in claim 3, wherein, following the emergence of the interfering light from the hypotenuse faces of the wedge prisms of the double wedge prism, the interfering light from respectively one portion U+Tx+R+Sx or T−Ux+S−Rx of the conjugate pupil, which has interfered, is split into two quarter portions U+Tx+Ry+Sxy and R+Sx−Uy−Txy or T−Ux+Sy−Rxy and S−Rx−Ty+Uxy in each case, guided in one of the further double wedge prisms within the meaning of a common path interferometer and superposed in constructive and destructive fashion by means of respectively one further double wedge prism, which is arranged with parallel small leg faces rotated through 90° with respect to the respective hypotenuse face of the wedge prism, such that four quarters of further conjugate pupils, which can be composed to make a full pupil image and which have each been made to interfere differently with all quarter portions R, S, T, U, emerge at the hypotenuse faces of the further double wedge prisms.

7. The method as claimed in claim 1, wherein
splitting the pupil beam into complementary portions P and Q of the pupil in the common path interferometer is realized by means of a double wedge prism,
guiding respectively one of the two complementary portions P or Q of the pupil as interferometer branches is implemented in separate wedge prisms, wherein an Amici-type roof prism is used in place of at least one of the wedge prisms, said roof prism, for the purposes of forming the wedge prism, being complemented with a complementary prism but being separated therefrom by an air gap, and
inverting the complementary portions P and Q is carried out as a rotation in the at least one roof prism by means of two internal reflections of the portions P or Q at roof edges of the one roof prism, and
interfering of the light of the at least one of the interferometer branches, reflected twice internally, is implemented at a contact area of the wedge prisms coated with a partly transmissive beam splitter layer, wherein twice reflected light of the one roof prism is superposed on transmitted light of the other wedge prism such that the beam splitting of the pupil leads to the interference of wavefronts, rotated through 180° with respect to one another, of the portions P and Q of the pupil.

8. The method as claimed in claim 7, wherein both wedge prisms are replaced by roof prisms with a complementary prism and an air gap in order to produce a full image of the conjugate pupil from the pupil by the interferometer branches with constructive and destructive interference.

9. An arrangement for improving the resolution or the signal-to-noise ratio of a laser scanning microscope by means for image inversion interferometry, containing means for mirroring a pupil beam in an interferometer branch in order to make a pupil image mirrored at at least one lateral axis interfere with an unchanged pupil image of another interferometer branch, wherein
a compact common path interferometer is provided for splitting the area of a pupil from the pupil beam along a defined axis that is lateral to an optical axis of the collimated beam by circular sectioning the pupil area into two complementary portions P and Q, the common path interferometer containing at least one double wedge prism made of two right angled, mirror symmetrically arranged wedge prisms, which each are in contact with one another on a large leg face (a) and which have a partly transmissive beam splitter layer therebetween,
light from the pupil beam with a pupil of the laser scanning microscope is directed in orthogonal fashion on a small leg face of the wedge prisms in each case, wherein either the first portion P or the second complementary portion Q of the pupil of the laser scanning microscope is coupled into the wedge prisms,
the light coupled into the wedge prisms, after total-internal reflection at at least one hypotenuse face of the wedge prism, is steered in the direction of the partly transmissive beam splitter layer and partly reflected and transmitted by the latter and made to interfere with light directed onto the beam splitter layer in the same manner, but opposite thereto, such that, at the beam splitter layer, transmitted and reflected light of the one wedge prism) and reflected and transmitted light of the other wedge prism are present for interference, wherein a combination of wavefronts of the first portion P of the pupil of the laser scanning microscope with the second, complementary portion Q of the pupil is produced by propagating through both interferometer branches adjusted with a minor phase difference therebetween.

10. The arrangement as claimed in claim 9, wherein the wedge prisms have such interior angles that light incident in orthogonal fashion at the small leg faces is aligned parallel to the beam splitter layer and parallel to base and cover faces of the wedge prisms, said light undergoes total-internal reflection upon first incidence on the hypotenuse face of each wedge prism and said light is directed in orthogonal fashion on the hypotenuse face upon the second incidence after reflection on the beam splitter layer.

11. The arrangement as claimed in claim 10, wherein the wedge prisms are embodied with interior angles of 90°, 60° and 30° and put together in the double wedge prism to form an equilateral prism, wherein
either a vertical offset of the partly transmissive layer of the double wedge prism in relation to the optical axis,
or a minor pitch angle of the double wedge prism in relation to the optical axis about a horizontal axis (x-direction) is set for adjusting the phase difference of the wavefronts.

12. The arrangement as claimed in claim 9, wherein the partly transmissive beam splitter layer is embodied as a neutral splitter layer.

13. The arrangement as claimed in claim 9, wherein the wedge prisms of the double wedge prism are displaceable with respect to one another along the beam splitter layer and parallel to the optical axis of the laser scanning microscope in order to be able to easily set a difference between optical path lengths in the two wedge prisms for adjusting the phase difference of the wavefronts.

14. The arrangement as claimed in claim 9, wherein an optical double wedge is arranged upstream or on one of the wedge prisms of the double wedge prism in a manner orthogonal to the optical axis of the laser scanning microscope and to the beam splitter layer in order to easily be able to set a difference between optical path lengths in the two wedge prisms for adjusting the phase difference of the wavefronts.

15. The arrangement as claimed in claim 9, wherein at least one further double wedge prism is disposed downstream of the double wedge prism and the hypotenuse faces of the double wedge prism and of the at least one further double wedge prism are aligned parallel to one another in order to be able to fold open the light from at least one of the portions (P+Qx) and (Q–Px) or (P–Qx) of the conjugate pupil to form a full pupil image, said light having been made to interfere and emerging from the beam splitter layer through the hypotenuse face.

16. The arrangement as claimed in claim 9, wherein at least one further double wedge prism is disposed downstream of the double wedge prism in the constructive interferometer channel C or the destructive interferometer channel D and said at least one further double wedge prism has small leg faces rotated through 90° parallel to the hypotenuse face of the double wedge prism in order to superpose the light of two of the portions U+Tx+R+Sx and R+Sx–Uy–Txy of the conjugate pupil, which has been made to interfere with the beam splitter layer and which emerges through one of the hypotenuse faces, on at least one quarter portion U+Tx+Ry+Sxy or R+Sx–Uy–Txy or T+Ux+Sy+Rxy or S+Rx–Ty–Uxy.

17. The arrangement as claimed in claim 9, wherein the pupil of the laser scanning microscope is provided and imaged in a conjugate pupil for image inversion interferometry.

18. The arrangement as claimed in claim 9, wherein the party tranmissive beam splitter layer is applied to one of the wedge prisms and provided as a cemented area for assembling the wedge prisms after a defined difference between the optical path lengths is set.

* * * * *